United States Patent [19]

Takahara et al.

[11] Patent Number: 4,692,824
[45] Date of Patent: Sep. 8, 1987

[54] MAGNETIC RECORDING/REPRODUCING APPARATUS

[75] Inventors: Masayuki Takahara; Motoyasu Momoki, both of Tokyo, Japan

[73] Assignee: Olympus Optical Co., Ltd., Tokyo, Japan

[21] Appl. No.: 910,276

[22] Filed: Sep. 16, 1986

Related U.S. Application Data

[63] Continuation of Ser. No. 564,336, Dec. 22, 1983.

[30] Foreign Application Priority Data

Dec. 28, 1982 [JP] Japan .................. 57-231343

[51] Int. Cl.⁴ .............................. G11B 5/08
[52] U.S. Cl. ................. 360/85; 360/95/107
[58] Field of Search ........... 360/85, 95, 105–109, 360/89, 130.22

[56] References Cited

U.S. PATENT DOCUMENTS

| 3,166,283 | 8/1979 | Van Slageren | 360/95 |
| 3,833,921 | 9/1974 | Kihara | 360/95 |
| 4,387,411 | 6/1983 | Clausen et al. | 360/95 |
| 4,491,885 | 1/1985 | Morikawa et al. | 360/85 |
| 4,517,613 | 5/1985 | Shibaike et al. | 360/85 |

FOREIGN PATENT DOCUMENTS

| 56-119968A | 9/1981 | Japan | 360/95 |
| 56-117361A | 9/1981 | Japan | 360/95 |
| 57-135472A | 8/1982 | Japan | 360/95 |
| 57-212651 | 12/1982 | Japan | 360/95 |

Primary Examiner—John H. Wolff
Assistant Examiner—Alfonso Garcia
Attorney, Agent, or Firm—Frishauf, Holtz, Goodman & Woodward

[57] ABSTRACT

In a magnetic recording/reproducing apparatus with a U-type ($\beta$ system) tape loading system, a rotary head cylinder is inclined toward a point where is located on the peripheral surface of the cylinder through an angular distance of 139° to 229° in a direction of the running of a magnetic recording tape on the peripheral surface of the cylinder from a point where the tape is separated from the cylinder, and a tilt subpost is disposed downstream of the cylinder along a tape travel direction and is brought into contact with the tape fed from the cylinder to align a longitudinal edge of the tape to be substantially parallel with a base plate.

9 Claims, 12 Drawing Figures

MAGNETIC RECORDING/REPRODUCING APPARATUS

This application is a continuation, of application Ser. No. 564,336, filed 12/22/83.

BACKGROUND OF THE INVENTION

The present invention relates to a magnetic recording/reproducing apparatus and, more particularly, to a magnetic recording/reproducing apparatus with a tape loading system wherein a magnetic recording tape is pulled out from a cassette and is wound around a rotary head cylinder.

Video tape recorders are well known as magnetic recording/reproducing apparatuses with the above-mentioned tape loading system. Several types of tape loading systems are known. Among them are the parallel loading system (sometimes called M type system or VHS system) and the U-type loading system (sometimes called Δ system). In any known system, a magnetic recording tape is pulled from the cassette and wound around a rotary head cylinder through a predetermined angle. After that, the rotary head cylinder is rotated and the tape is run. And, at that time, the helical scanning of the tape is conducted, whereby signals are recorded on or reproduced from the the magnetic recording tape.

FIGS. 1 to 3 are schematic views showing a conventional tape loading system for use in a video tape recorder. This is a parallel loading system. As shown in FIG. 1, a rotary head cylinder 1 is rotatably disposed on the chassis of a video tape recorder. Two recording/playback heads (not shown) are spaced apart by an angular interval of 180° along the circumference of the rotary head cylinder 1. The cylinder 1 is inclined at a predetermined angle to the direction of arrow S where is a point on the peripheral surface of the rotary head cylinder 1 near its tape entrance point. It is rotated by a motor (not shown) at a predetermined speed in the recording or playback mode. As shown in FIG. 3, a loading post 2 and a tilt post 3 are mounted on a loading arm 4. Likewise, a loading post 2' and a tilt post 3' are mounted on a loading arm 4'. The tilt posts 3, 3' are inclined in the same direction. The posts 2 and 3 form a loading member, and the posts 2' and 3' also form a loading member. These loading members are positioned in the opening of the cassette case, as indicated by broken lines in FIG. 1, before a magnetic recording tape 15 stored in a cassette 16 is wound around the cylinder 1. They are moved by the loading arms 4 and 4' in the directions indicated by arrows A, thereby pulling the tape 15 out of the cassette 16 and winding it around the cylinder 1. Finally they are located symmetrical with respect to the cylinder 1, as indicated by solid lines in FIG. 1.

Referring to FIG. 1, reference numerals 6 and 7 respectively denote impedance rollers and they are used to ensure a stable traveling of the tape 15. Hence, the free vibration of the tape 15 is suppressed so as to decrease jitter components. An audio control signal recording/reproducing head 8, a full-width erase head 9, a tension post 10, a pinch roller 11, and a capstan 12 are further provided. The capstan 12 cooperates with the pinch roller 11 to cause the tape 15 to travel at a predetermined speed.

When the loading post 2 and tilt post 3 and the loading post 2' and tilt post 3' are moved substantially parallel, in the directions of arrows A, the tape 15 which is wound around the supply reel 13 and a take-up reel 14 of the cassette 16 is automatically pulled out and wound around the rotary head cylinder 1 through an angle of $\beta$ as shown in FIG. 2. In the video tape recorder using the parallel loading system, since the tape 15 can be wound around the cylinder 1 when the posts 2, 3, 2', 3' are so moved as shown by arrows A in FIG. 1, the loading mechanism comprised of these posts 2, 2', 3, 3' needs a considerably small space. Futhermore, the upper edge of the tape 15 at the tilt post 3 located on the tape entrance side, the upper edge of the tape 15 on that point of the cylinder 1 which is at an angular distance of about 90° from the tilt post 3, and the upper edge of the tape 15 at the tilt post 3' located on the tape exit side are set at substantially the same height "H" from the surface 17 of the chassis. Therefore, the video tape recorder, which has the parallel loading system, is smaller, particularly thinner, than the video tape recorder having an U-type loading system, as well known in this field of art.

In recent years it is much demanded that the video tape recorder be made portable. The manufacturers have long been making great efforts to provide a portable video tape recorder. Most of the existing video tape recorders for household use employ a tape reel having a width of 12.7 mm. The cassette containing two reels of this size hinders the miniaturization of video tape recorders. At present, the manufacturers are trying to develop a video tape recorder which uses a magnetic recording tape having a width of 8 mm (hereinafter referred to as "an 8 mm VTR"). Some prototype 8 mm VTRs have already been produced.

Of these 8 mm VTRs, the type which uses the so-called parallel loading system is particularly advantageous from the standpoint of reducing the planar size and thickness of a VTR. Nonetheless, whether the magnetic recording tape has a width of 12.7 mm or 8 mm, the parallel loading system requires two tilt posts 3 and 3' to guide a magnetic recording tape 15 over the outer peripheral surface of a rotary head cylinder and also to smoothly remove the tape 15 therefrom. (In contrast, the U-type loading system requires only one tilt post on the tape entrance side to smoothly guide and remove the tape, regardless of the width of the tape, 12.7 mm or 8 mm.) To make the matter worse, the tilt posts 3, 3' are not allowed to revolve. Should they revolve by themselves, the tape 15, which slidably contacts those posts, would be moved along in the longitudinal direction of these posts 3, 3'. In this event, the upper edge of the tape 15 contacting the posts 3, 3' would have a greater height from the surface 17 than the aforementioned height H. This would make it impossible to retain the thinness of the parallel loading system. Not only the tilt posts 3, 3' are set very close to the tape inlet point "m" and tape outlet point "n" on the peripheral surface of the rotary head cylinder 1. Also, the sum of the angles through which the tape 15 is wrapped around parts of the tilt posts 3, 3' (hereinafter it is called as a tape loading angle) is much greater than the angle through which the tape is wound around the single tilt post of the U-type loading system. This is because the tape 15 travels to the tilt post 2 on the tape entrance side, with its upper edge positioned parallel with the surface 17, then has its travelling direction abruptly changed by the tilt post 3, then is smoothly guided onto the tape contact point "m" of the cylinder 1 which is inclined to the surface 17 at an angle $\alpha$, about twice the read angle $\delta$; the tape 15 further travels toward the tape release point "n" of cylinder 1, with its upper edge inclined to the surface 17, has its traveling direction suddenly changed by the other tilt post 3' set on the tape exit side, and finally travels, with its upper edge rendered parallel with the surface 17 of the chassis.

With an 8 mm VTR, the tape loading angle of the rotary head cylinder 1 is standardized to 221° regardless of the kinds of the tape loading systems. And in the 8 mm VTR using the parallel loading system, the cylinder 1 was inclined at 12° to the surface 17 of the chassis, the same angle as observed in the 12.7 mm VTR. Then, the sum of the tape loading angles of the tilt posts 3, 3' was found to be about 140°, as calculated by the present inventor.

Therefore, a considerably large frictional force is produced between the magnetic recording tape 15 and each of the tilt posts 3 and 3' and considerable tension is imported to the tape 15. When a thin magnetic recording tape in which a magnetic layer is formed by a metalization (hereinafter, it is called as a metalized magnetic tape) is used, frictional resistance is further increased. This is because its adhesivity to the peripheral surface of the rotary head cylinder 1 and the tilt posts 3, 3' is far greater than that of the tape 15 in which a magnetic layer is formed by a pasting process. As a result, the metalized magnetic tape is liable to be damaged and an irregular running.

The U-type loading system, which is as commonly used as the parallel loading system, has a merit and a drawback which are diametrically opposite to those of the parallel loading system. More specifically, it is advantageous in that the tape encounters little frictional resistance, regardless of its width; is disadvantageous in that the VTR using it is far larger and thicker than the VTR using the parallel loading system. Obviously, the U-type loading system is less desirable than the parallel loading system in the field of the 8 mm VTR which is expected to be made portable. Nevertheless, when a recording tape with a thermally deposited magnetic layer is used, it is considered far more advantageous than the parallel loading tystem. Hence, the manufactures of VTRs are trying to make the U-type loading system more adapted for the 8 mm VTR. The Japanese Patent Disclosure (Kokai) 57-21265 discloses a modified, simple-structured U-type loading system. This U-type loading system is known as "a $\mu$-type loading system" to the people skilled in the art.

FIGS. 4 and 5 show a plan view and partially sectional side views of the $\mu$-type loading system, respectively. In these figures, the same reference numerals are used to denote like or the same elements as shown in FIGS. 1 to 3. A detailed description of the like or same elements will be omitted.

In the $\mu$-type loading system, a magnetic recording tape 15 is pulled out of a cassette 16 by first to third guide rollers 22, 23 and 24 and a tilt post 25 which is not rotatable. The guide rollers 22, 23, 24 and tilt post 25 are mounted on a loading ring 21 which may rotate clockwise around a rotary head cylinder 1. The tape 15 is then wound around the cylinder 1. Unlike in the case of the parallel loading system, the rotary head cylinder 1 is inclined in a direction (shown by arrow S) opposite to the direction in which the tape 15 is moved away from the cylinder 1. A tilt angle $\alpha$ is set to be about 5° and is substantially the same as a read angle with respect to the tape 15. Therefore, as shown in FIG. 5, the upper edge of the tape 15 fed from the cylinder 1 to a capstan 12 is substantially parallel to the chassis surface 17 of the video tape recorder. For this reason, the $\mu$-type loading system need not be provided with a member equivalent to the tilt post 3' which is indispensable to the parallel loading system and which is disposed on the tape exit side to compensate the inclination of the upper edge of the tape 15 to the chassis surface 17 in the parallel loading system. The omission of the tilt post 3', which is a fixed post with the large tape loading angle (i.e., about 70°) and which imposes a large frictional force on the tape 15, decreases the frictional force acting on the magnetic recording tape 15.

Furthermore, when the $\mu$-type loading system is applied to the 8 mm VTR in which the tape loading angle of the rotary head cylinder 1 is 221°, it is most desired, as the inventor has calculated, that the tape loading angle of the tilt post 25 be about 30°. Apparently, the frictional resistance imposed on the tape 15 is far less than in the case of the parallel loading system. Furthermore, since the guide posts 27 and 26 are fixed on the chassis surface 17 of the video tape recorder in the vicinity of a tape exit point "n" and a tape entrance point "m" of the rotary head cylinder 1, the magnetic recording tape 15 may travel stably at all times. Therefore, even if a thin magnetic recording tape with a thin magnetic layer metalized thereon is used, it will not be damaged or unstably travel.

Indeed the $\mu$-type loading system is simpler in structure than the U-type loading system, but it cannot help reduce the planar size or thickness of the video tape recorder. This is because the $\mu$-type loading system is essentially identical with the U-type loading system in respect of the method of winding the tape around the rotary head cylinder 1.

More specifially, as shown in FIG. 5, the cylinder 1 is inclined in the direction of arrow S so that the upper edge of the tape 15 may travel from the cylinder 1 to the capstan 12, parallel to the upper surface 17 of the chassis. If the tape 15 could not travel in this way, a tilt post should be provided in the vicinity of the tape exit point "n" of the cylinder 1. Since the rotary head cylinder 1 is inclined in the direction of arrow S, the first guide roller 22 is inclined toward the tape entrance point "m", as shown in FIG. 4. Otherwise, the tape 15 may not be smoothly guided to the tape entrance point "m" of the cylinder 1. Moreover, to minimize the frictional resistance to the tape 15, the first guide roller 22 is made to rotate freely. Hence, the tape 15 may move on this roller 22 along the axis thereof, thus causing a track displacement. To avoid a track displacement, the upper longitudinal edge of the tape 15 at the first guide roller 22 is set at height h from the upper surface 17 of the chassis, which is greater than the height H of the upper longitudinal edge of the tape 15 at the tape exit point "n" of the rotatry head cylinder 1. In other words, that portion of the tape 15 which travels from the guide roller 22 to the tape entrance point "n" is inclined. Since the tape 15 is so inclined, the $\mu$-type loading system is inevitably thicker than the parallel loading system. The 8 mm VTR with the $\mu$-type loading system cannot be as thin as desired.

The tape loading angle of the tilt post 25 is only 30° in order to reduce the frictional resistance which the tape 15 may receive from the post 25. Therefore, the distance $L_2$ between the tilt post 25 and the first guide roller 22 must be relatively long so as to increase the height of the upper longitudinal edge of the tape 15 from "H" to "h" as the tape 15 runs from the tilt post 25 to the first guide roller 22 through the distance $L_2$. The planar size of the 8 mm VTR with the $\mu$-type loading system is inevitably greater than that of the 8 mm VTR with the parallel loading system.

Suppose the μ-type loading system is used in an 8 mm VTR in which the tape loading angle β and read angle δ are standardized as 221° and about 5°, respectively. Since an erasing head 9, which has a width of 8 mm, is disposed between the tape entrance point "m" and the first guide roller 22, the distance $L_1$ between the "m" and the roller 22 is so set that it is about 28 mm. In this case, height "h" is greater by about 12 mm than height "H". As mentioned above, the tape loading angle of the tilt post 25 is about 30°. Hence, distance $L_2$ is calculated to be 74 mm. It follows that the loading ring 21, on which the first to third guide rollers 22, 23, 24 and the tilt post 25 (unrotatable) are mounted, must have a diameter of approximately 90 mm.

Further, if the erase head 9 is removed, thus reducing the distance $L_1$ to 20 mm, while leaving the other dimensional conditions unchanged, height h is greater by 11 mm than height H, as calculated by the present inventor.

SUMMARY OF THE INVENTION

The present invention has been made in consideration of the above situation, and has for its object to provide a magnetic recording/reproducing apparatus wherein a magnetic recording tape in which a magnetic layer is formed by a metalization so as to make it have a very thin thickness can be properly used without damage and unstable running, and the thickness and planar size of the apparatus compared with that of a magnetic recording/reproducing apparatus using a μ-type tape loading system can be decreased.

According to an aspect of the present invention, there is provided a magnetic recording/reproducing apparatus using a tape loading system having: a rotary head cylinder mounted on a base plate in an inclined manner and which rotates in one direction; a loading ring to be rotated around the rotary head cylinder; a first guide roller mounted on the loading ring, being movable, upon rotation of said loading ring, between a first position wherein the first guide roller is located in an opening of a cassette, the cassette being located in a vicinity of the rotary head cylinder and storing a magnetic recording tape therein, and a second position wherein the first guide roller is located outside the opening of said cassette, engaged with the magnetic recording tape stored in the cassette pulling the magnetic recording tape from the cassette to wind the magnetic recording tape on the peripheral surface of the rotary head cylinder when the first guide roller moves from the first position to the second position thereof, and positioned upstream of the rotary head cylinder along a tape travel direction and smoothly guiding the magnetic recording tape onto the peripheral surface of the rotary head cylinder when the first guide roller is located in the second position; a second guide roller being movable between a first position wherein the second guide roller is located in the opening of the cassette and a second position wherein the second guide roller is located outside the opening of the cassette, moved from the first position to the second position thereof so as to correspond to movement of the first guide roller from the first position to the second position thereof upon rotation of the loading ring, engaged with the magnetic recording tape pulled out from the cassette when the second guide roller moves from the first position to the second position thereof, and positioned upstream of the first guide roller along a tape travel direction and preventing the magnetic recording tape traveling from upstream of the second guide roller to the first guide roller from being brought into contact with the peripheral surface of the rotary head cylinder when the second guide roller is located at the second position thereof; and a tilt post being movable between a first position wherein the tilt post is located in the opening of the cassette and a second position wherein the tilt post is located outside the opening, moved from the first position to the second position thereof so as to correspond to movement of the first guide roller from the first position to the second position thereof upon rotation of the loading ring, engaged with the magnetic recording tape pulled out from the cassette when the tilt post moves from the first position to the second position thereof, and positioned upstream of the second guide roller along the tape travel direction and preventing the magnetic recording tape traveling from the cassette to the second guide roller from being brought into contact with the peripheral surface of the rotary head cylinder and smoothly guiding the magnetic recording tape from the cassette to the first guide roller through the second guide roller when the tilt post is at the second position thereof, characterized in that the apparatus comprises: a tilt subpost disposed downstream of the rotary head cylinder along the tape travel direction and brought into contact with the magnetic recording tape fed from the rotary head cylinder to align a longitudinal edge of the magnetic recording tape to be substantially parallel with the base plate, the rotary head cylinder inclined toward a point where is located on the peripheral surface of the rotary head cylinder through an angular distance of 139° to 229° in a direction of the running of the magnetic recording tape on the peripheral surface of the rotary head cylinder from a point where the magnetic recording tape is separated from the rotary head cylinder. Therefore, even if a magnetic recording tape in which a magnetic layer is formed by a metalization so as to make it have a very thin thickness is used, it will neither be damaged nor be unstable driven. And also in this case, the thickness and the planar size of the apparatus compared with that of the magnetic recording/reproducing apparatus using a μ-type tape loading system can be decreased.

In the present invention, it is preferable that the tilt subpost is movable between a first position wherein the tilt subpost is spaced apart from the magnetic recording tape and a second position wherein the tilt subpost is brought into contact with the magnetic recording tape at a position downstream of the rotary head cylinder along the tape travel direction so as to guide the magnetic recording tape, the first position of the tilt subpost being located in the opening of the cassette.

In such a construction as described above, since the tilt subpost can be moved between the first and second positions thereof with the subpost being substantially parallel to the base plate, the thickness of the apparatus will not be increased and the magnetic recording tape can be easily wound around the outer peripheral surface of the rotary head cylinder.

In the present invention, it is preferable that the tilt post comprises a tilt post base being provided with the tilt post, and mounted on the loading ring so as to move the tilt post between the first position and the second position of the tilt post upon rotation of the loading ring; and tilt post position controlling means for moving the tilt post base relative to the loading ring when the tilt post is moved from the first position to the second position thereof upon rotation of the loading ring, and for setting a distance between the tilt post and the second guide roller when the tilt post and the second guide roller are respectively located in the second positions thereof to be greater than a distance between the tilt post and the second guide roller when the tilt post and the second guide roller are respectively located in the first positions thereof; and the tilt post position controlling means comprises a guide hole which is formed in the loading ring and has a shape as part of a concentric circle of the loading ring; a guide pin mounted on the tilt post base, inserted in the guide hole, and guided along the guide hole; and a stopper for locating the tilt post in the second position thereof such that the stopper abuts against the guide pin of the tilt post base which is moved from the first position of the tilt post together with the loading ring when the first and second guide rollers are moved from the first positions to the second positions thereof, respectively, and that the stopper stops the tilt post base, and for moving the guide pin of the tilt post base in the guide hole relative to the rotary head cylinder until the first and second guide rollers reach the second positions thereof, respectively, so that the distance between the tilt post and the second guide roller when the tilt post and the second guide roller are respectively located in the second positions thereof is set to be greater than the distance between the tilt post and the second guide roller when the tilt post and the second guide roller are respectively located in the first positions thereof.

BRIEF DESCRIPTION OF THE DRAWINGS

FIG. 12 is an enlarged partial sectional view schematically showing the rotary head cylinder and its vicinity shown in. FIG. 7, and FIG. 13 is an enlarged partial sectional view of the apparatus shown in FIG. 7 taken along line XIII—XIII, with shaft 29 and roller 30 removed for clarity.

Figure 1:
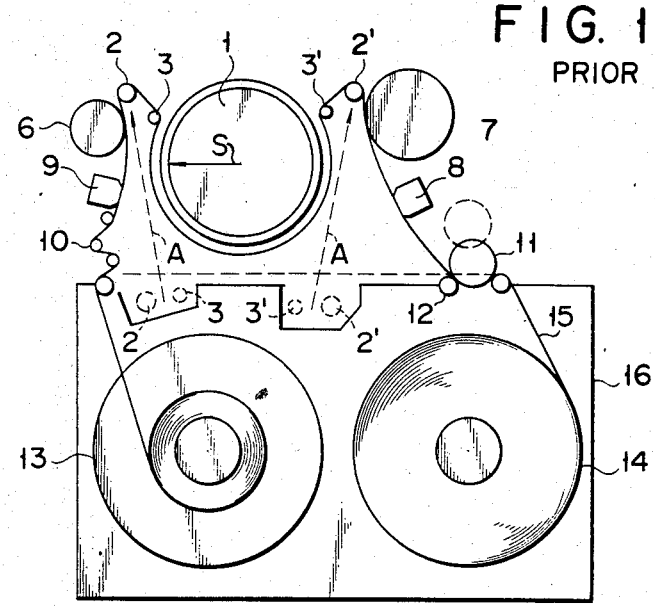
FIG. 1 is a schematic plan view showing the overall construction of a conventional magnetic recording/reproducing apparatus using a M-type loading system.
Figure 2:
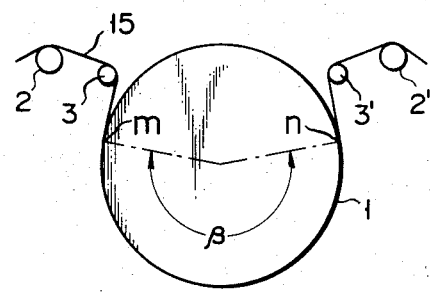
FIG. 2 is a schematic enlarged plan view showing the rotary head cylinder of the apparatus shown in FIG. 1 and its vicinity.
Figure 3:
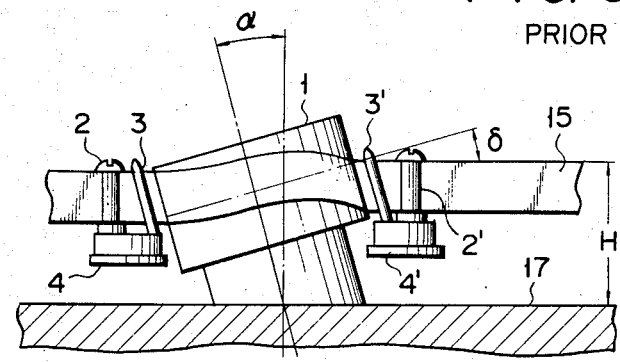
FIG. 3 is a schematic side view showing the rotary head cylinder of the apparatus shown in FIG. 1 and its vicinity.
Figure 4:
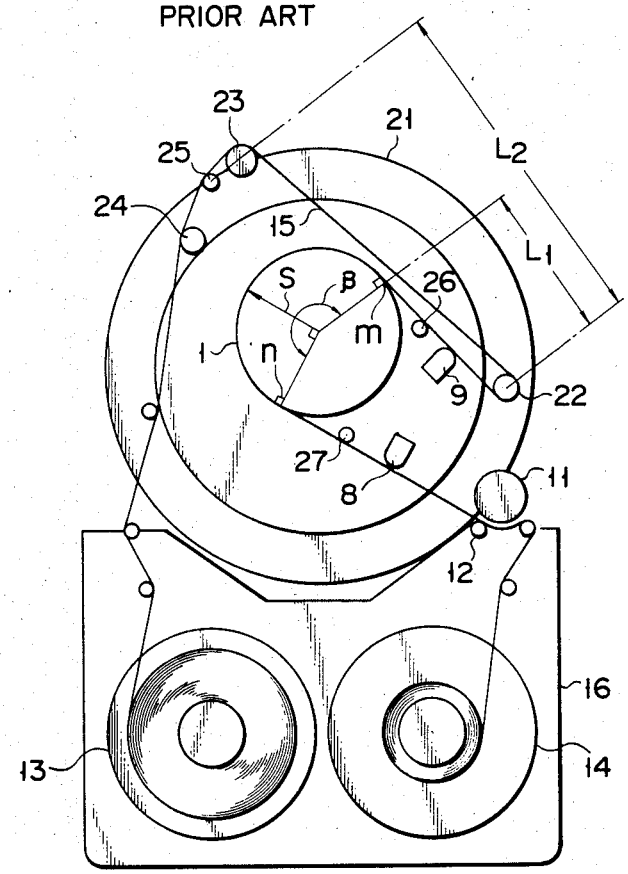
FIG. 4 is a schematic plan view showing the overall construction of a 8 mm magnetic recording/reproducing apparatus using a $\mu$-type loading system.
Figure 5:
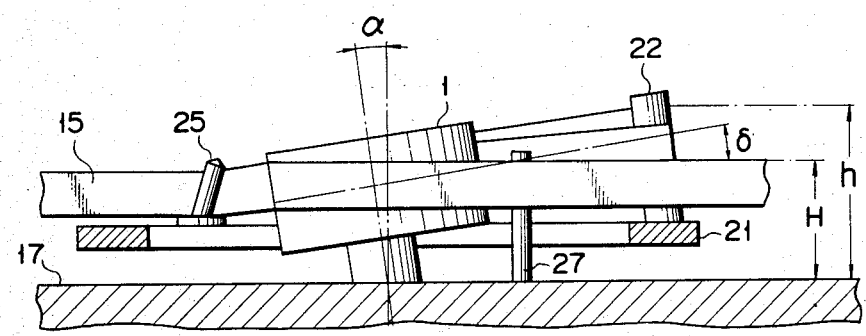
FIG. 5 is a schematic enlarged side view showing the rotary head cylinder of the apparatus shown in FIG. 4 and its vicinity.

A 8 mm video tape recorder as a magnetic recording/reproducing apparatus, according to the preferred embodiment of the present invention will be described with reference to the accompanying drawings. Throughout the detailed description of the preferred embodiment, the same reference numerals used in the first conventional example with reference to FIGS. 1 to 3 and the second conventional example with reference to FIGS. 4 and 5 denote the same parts in the preferred embodiment, and a detailed description thereof will be omitted.

DETAILED DESCRIPTION OF THE PREFERRED EMBODIMENT

Figure 6:
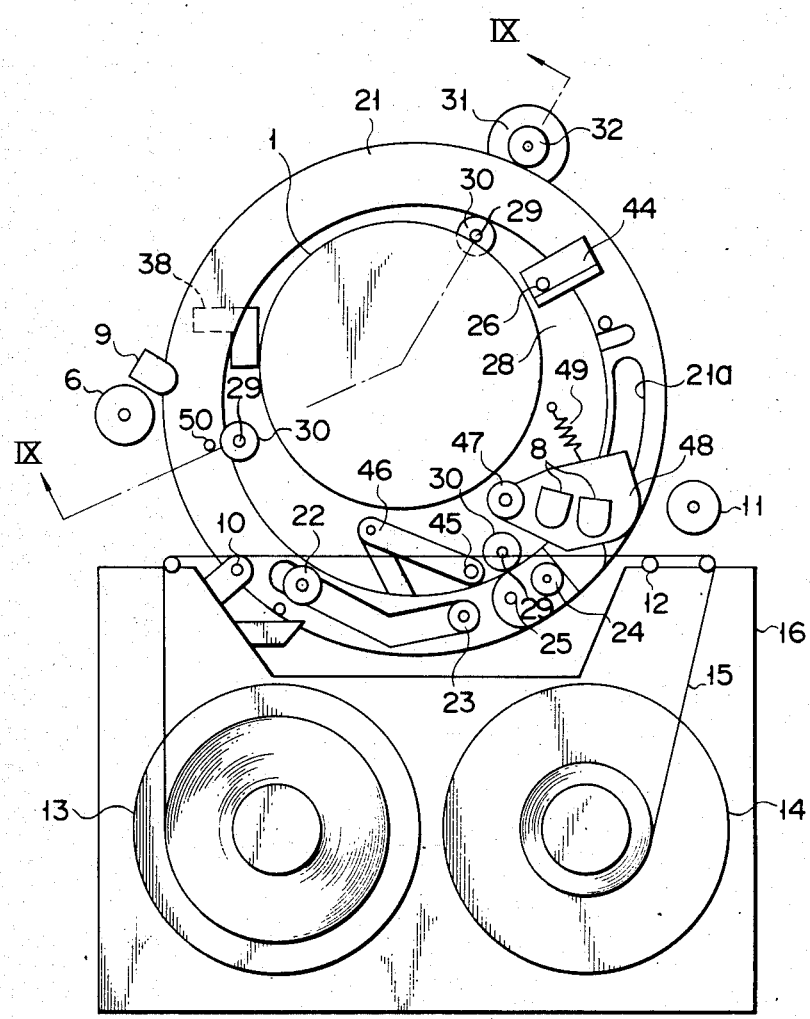
FIG. 6 is a schematic plan view showing the overall construction of a magnetic recording/reproducing apparatus according to an embodiment of the present invention in the unloading state.
Figure 7:
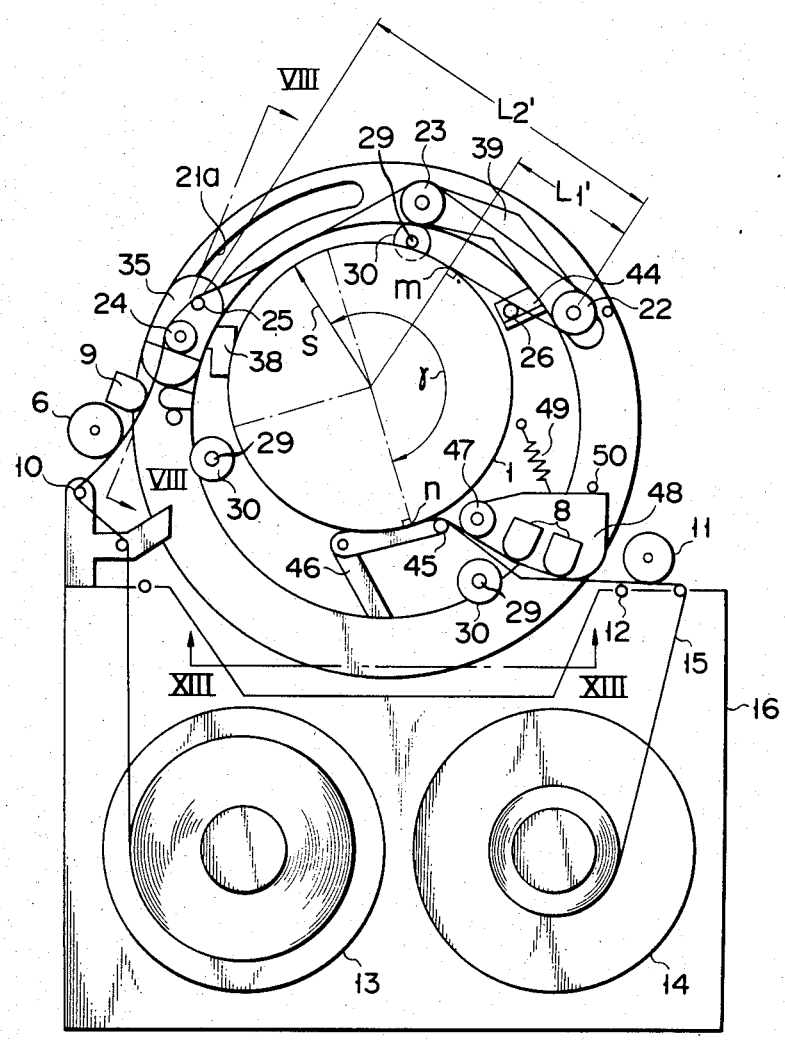
FIG. 7 is a schematic plan view showing the overall construction of a magnetic recording/reproducing apparatus according to an embodiment of the present invention in the loading state.
Figure 8:
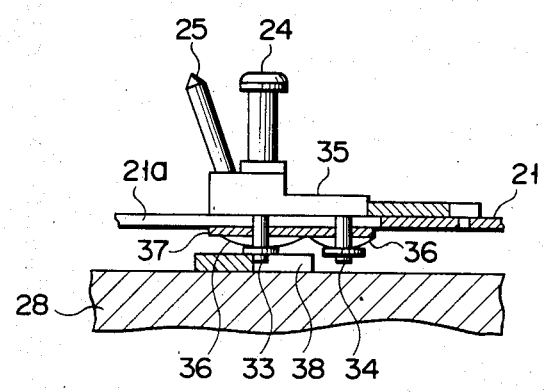
FIG. 8 is a sectional view of the apparatus shown in FIG. 7 taken along the line VIII—VIII thereof.
Figure 9:
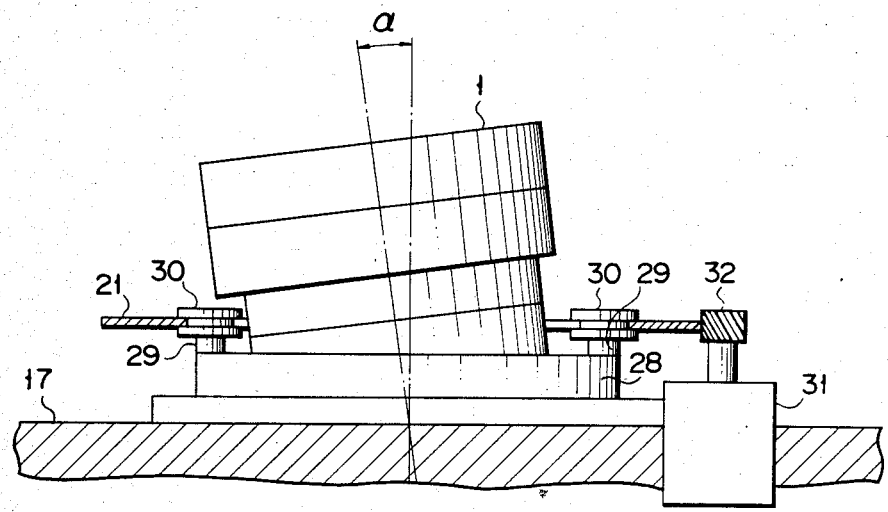
FIG. 9 is a sectional view of the apparatus shown in FIG. 6 taken along the line IX—IX thereof.
Figure 12:
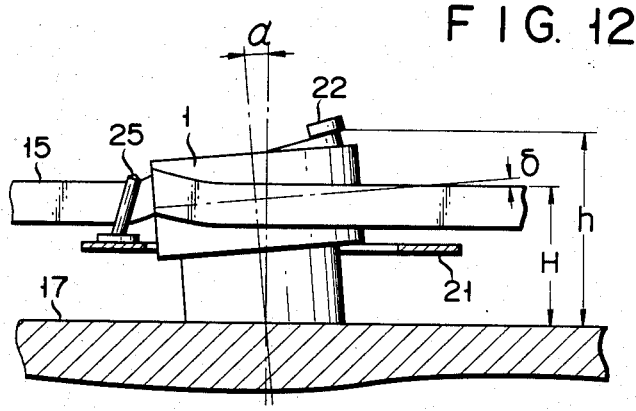

A rotary head cylinder 1 shown in FIG. 7 is inclined toward a point (direction indicated by arrow S) which is located on a peripheral surface of the rotary head cylinder 1 through an angle $\gamma$ 139° to 229° in a direction of the running of a magnetic recording tape 15 on the peripheral surface of the rotary head cylinder 1 (counterclockwise in this embodiment) from a point (to be referred to as a tape exit point hereinafter) "n" where a magnetic recording tape 15 is separated from the outer peripheral surface of the rotary head cylinder 1. As shown in FIGS. 9 and 12, a tilt angle $\alpha$ of the rotary head cylinder 1 is set to be greater than a read angle $\delta$ shown in FIG. 12. A loading ring 21 shown in FIG. 6 is rotatably supported by three rollers 30 rotatably mounted on three shafts 29 planted on a base mount 28 and is held to be parallel with a chassis surface 17, as shown in FIG. 9. The base mount 28 is mounted on the chassis surface 17. The loading ring 21 is meshed with a gear 32 directly coupled to a motor 31. A guide slot 21a is formed in the loading ring 21 and has a shape as part of a concentric circle of the loading ring 21. Guide pins 33 and 34 are mounted on the lower surface of a tilt post base 35 having an upper surface provided with a tilt post 25 and a third guide roller 24, and are inserted in the guide slot 21a, as shown in FIG. 8. The tilt post base 35 cooperates with a sliding plate 37 urged against the lower surface of the loading ring 21 by means of leaf springs 36 mounted on the guide pins 33 and 34 and clamps the loading ring 21 with the sliding plate 37. The tilt post base 35 causes the tilt post 25 and the third guide roller 24 to locate in the vicinity of the second guide roller 23 in the opening of a cassette 16 in the unloading state, as shown in FIG. 6. When the tilt post 25 and the third guide roller 24 reach predetermined positions outside the opening during clockwise rotation of the loading ring 21 in the loading state, the tilt post base 35 abuts against a stopper 38 formed on the base mount 28 and stops. It is moved relatively to the loading ring 21 which is still rotating. Therefore, as shown in FIG. 7, the tilt post 25 and the third guide roller 24 are away moved in the looking state from the second guide roller 23, as compared with the relative distance therebetween in the unloading state. The position of the tilt post 25 in the opening of the cassette 16 and the position of the tilt post 25 when the tilt post base 35 is stopped by the stopper 38 correspond to the first and second positions of the tilt post 25, respectively.

Figure 10:
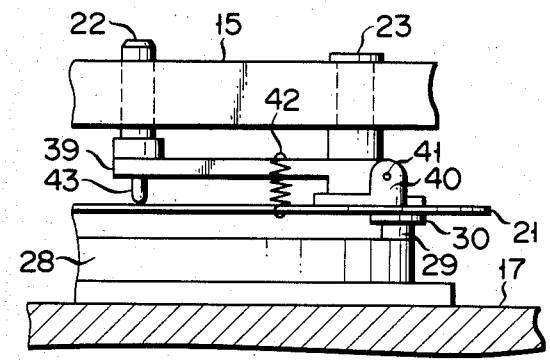
FIG. 10 is an enlarged partial sectional view schematically showing the first and second guide rollers and their vicinities shown in FIG. 6.
Figure 11:
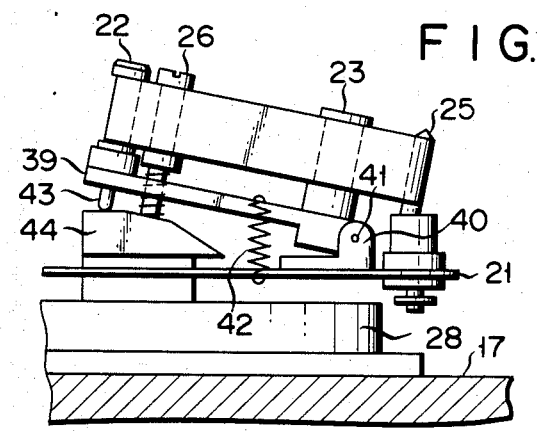
FIG. 11 is an enlarged partial sectional view schematically showing the first and second guide rollers and their vicinities shown in FIG. 7.

The first and second guide rollers 22 and 23 are vertically planted on a guide roller base 39, as shown in FIGS. 10 and 11. The guide roller base 39 is coupled to a pin 41 to be rotatable about a hinge support 40 mounted on the upper surface of the loading ring 21. The guide roller base 39 is parallel to the upper surface of the loading ring 21 in the unloading state (FIG. 6) wherein a distal end of a pin 43 abuts against the upper surface of the loading ring 21 by means of the biasing force of a return spring 42, as shown in FIG. 10. Furthermore, in the unloading state shown in FIG. 6, the first and second guide rollers 22 and 23 are located in the opening of the cassette 16. However, in the loading state shown in FIG. 7, the distal end of the guide pin 43 ascends and stops on a tilt surface of a sliding support 44 mounted on the base mount 28, as shown in FIG. 11, so that the guide roller base 39 (i.e. the first and second guide rollers 22 and 23) is inclined at a predetermined angle with respect to the upper surface of the loading ring 21. The positions (FIG. 6) of the first and second guide rollers 22 and 23 located in the opening, and the positions (FIG. 7) of the first and second guide rollers 22 and 23 located outside the opening and inclined as shown in FIG. 11 are defined as the first positions and the second positions of the first and second guide rollers 22 and 23, respectively.

Figure 13:
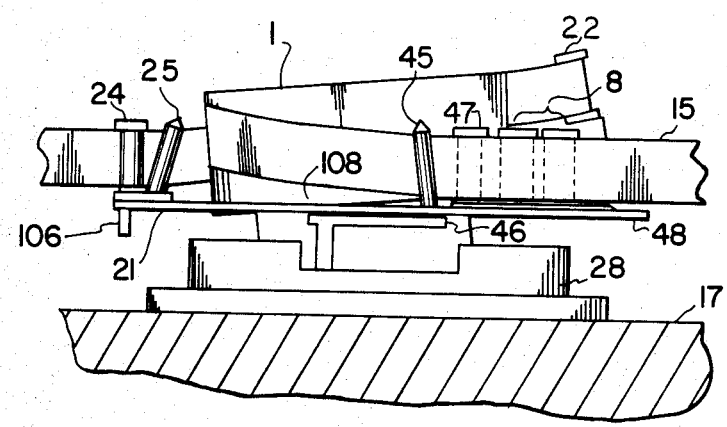

In this embodiment, in the loading state shown in FIGS. 7 and 13 a tilt subpost 45 is disposed in the vicinity of the tape exit point "n" on the outer surface of the rotary head cylinder 1. The tilt subpost 45 is brought into contact with the magnetic recording tape 15 fed from the tape exit point "n" and is inclined in a direction different from the tilt direction S of the rotary head cylinder 1 so as to set the longitudinal edge of the magnetic recording tape 15 to be substantially parallel to the chassis's surface 17. The tilt subpost 45 is planted on a tilt subpost lever 46. In the unloading state shown in FIG. 6, the tilt subpost 45 is located in the opening of the cassette 16 in the same manner as the first to third guide rollers 22 to 24 and the tilt post 25, upon operation actuation of the subpost lever 46. The position (FIGS. 7,13) where the the tilt subpost 45 is in contact with the magnetic recording tape 15 and the position (FIG. 6) where the tilt subpost 45 is located in the opening of the cassette 16 are defined as the second and first positions of the tilt subpost 45, respectively.

Audio control signal recording/reproducing heads 8 are mounted on a head mount plate 48 rotatably mounted on a shaft of a guide roller 47 mounted on the base mount 28. The head mount plate 48 is biased counterclockwise by the biasing force of a head return spring 49 hooked between the base mount 28 and the head mount plate 48. In the unloading state, the head mount plate 48 is spaced apart from the magnetic recording tape 15 in the cassette 16, as shown in FIG. 6. However, in the loading state, the head mount plate 48 is rotated clockwise by a head positioning pin 50 mounted on the upper surface of the loading ring 21 against the biasing force of the head return spring 49, so that the audio control signal recording/reproducing head 8 is brought into contact with the magnetic recording tape 15, as shown in FIG. 7.

In the embodiment having the construction described above, when the loading ring 21 is rotated clockwise, the first guide roller 22 which is located in the opening of the cassette 16 engages with the magnetic recording tape 15 and pulls the magnetic recording tape 15 out of the cassette 16. The first guide roller 22 then winds the magnetic recording tape on the outer peripheral surface of the rotary head cylinder 1, as shown in FIG. 7. During this operation, the second guide roller 23, the tilt post 25 and the third guide roller 24 sequentially engage with the magnetic recording tape 15 while the loading ring 21 is rotated.

While the rotary head cylinder 1 is rotated counterclockwise in FIG. 7 and the magnetic recording tape 15 travels at a given speed in the same rotational direction as that of the rotary head cylinder 1 from the supply reel 13 to the take-up reel 14 by means of a set of the pinch roller 11 and the capstan 12, the first guide roller 22 located upstream of the rotary head cylinder 1 along the tape travel direction smoothly supplies the magnetic recording tape 15 to the tape entrance point "m" on the outer peripheral surface of the tilted rotary head cylinder 1. The second guide roller 23 located upstream of the first guide roller 22 along the tape travel direction prevents the outer peripheral surface of the rotary head cylinder 1 from being brought into contact with the magnetic recording tape 15 traveling from the tilt post 25 located upstream the second guide roller 23 to the first guide roller 22. Furthermore, the third guide roller 24 which is located upstream of the tilt post 25 along the tape travel direction controls the running position of the magnetic recording tape 15 traveling from the cassette 16 to the tilt post 25 so as to prevent the tape loading angle of the magnetic recording tape 15 on the tilt post 25 from being over the predetermined value. In particular, the tilt post 25 smoothly supplies the magnetic recording tape from the cassette 16 to the first guide roller 22 through the second guide roller 23 which is inclined as shown in FIG. 11.

In this embodiment, since the tape loading angle $\beta$ and the read angle $\delta$ is so standardized as 221° and 5° respectively as 8 mm VTR, the diameter of the rotary head cylinder 1 is so set as the same as that of the rotary head cylinder 1 of the above-mentioned 8 mm VTR using the $\mu$-type loading system, the rotary head cylinder 1 is tilted, as shown by arrow S, toward the portion where is far from the tape exit point "n" through 200° in the running direction of the magnetic recording tape 15 on the peripheral surface of the rotary head cylinder 1, the tilt angle $\alpha$ of the rotary head cylinder 1 is so set as about 7°, and the distance $L_1$ between the center of the first guide roller 22 and the tape entrance point "m" of the rotary head cylinder 1 is set to be about 20 mm, inventors of this invention ascertain, by their calculation, that the diameter of the loading ring 21 could be about 70 mm, and the distance between the first guide roller 22 and the tilt post 25 could be about 37 mm. In addition to this, inventors also ascertain, by their calculation, that the difference between the height H between the chassis's surface 17 and the upper longitudinal edge of the magnetic recording tape 15 when the magnetic recording tape 15 passes the tilt subpost 45 and the upper edge of the magnetic recording tape 15 becomes parallel with the chassis's surface 17, and the height h between the chassis's surface 17 and the upper edge of the magnetic recording tape at the first guide roller 22 could be about 6.5 mm.

When the data were given as described above, a total of tape loading angles on the fixed tilt post 25 and the fixed tilt subpost 45 could be about 75°.

The values 37 mm, 6.5 mm, 70 mm and 75° respectively as the distance $L_2$, (h - H), the diameter of the loading ring 21, and the total of tape loading angles on the fixed tilt post 25 and the fixed tilt subpost 45 are significantly lower as compared with the values 74 mm (67 mm when the width of the full-width erase head 9 is subtracted from the distance $L_1$), 12 mm (11 mm under the same conditions as described above), 90 mm and 30° of the above-mentioned 8 mm video tape recorder using the μ-type tape loading system, except for the total angle. Therefore, the plane area and thickness of the housing can be greatly decreased as compared with the above-mentioned 8 mm video tape recorder using the μ-type tape loading system. The total tape loading angle on the fixed tilt post 25 and the fixed tilt subpost 45 is greater than that of the above-mentioned 8 mm video tape recorder using the μ-type tape loading system, but is greatly smaller than 140° of the total tape loading angle of the 8 mm video tape recorder using the parallel tape loading system. Therefore, even if the magnetic recording tape has magnetic layer which is made by metalizing so as to make the tape thinner, this magnetic recording tape 15 can run stably without being damaged and subjected to irregular running.

In an experiment made by the inventors of this invention and relating to the tape loading angle on the tilt post, a metalized magnetic recording tape having a thickness of about 10 μm could be properly driven until the total of tape loading angles on the tilt post 25 and the tilt subpost 45 reached about 120° ($\beta = 190°$).

What is claimed is:

1. A μ-type of magnetic recording/reproducing apparatus using a tape loading system comprising: a rotary head cylinder mounted on a chassis in an inclined manner and which rotates in one direction; a loading ring to be rotated around said rotary head cylinder; a first guide roller mounted on said loading ring, being movable, upon rotation of said loading ring, between a first position wherein said first guide roller is located in an opening of a cassette, said cassette being located in a vicinity of said rotary head cylinder and storing a magnetic recording tape therein, and a second position wherein said first guide roller is located outside opening of said cassette, engaged with the magnetic recording tape stored in said cassette and retaining the magnetic recording tape so that it is wound from a tape entrance point to a tape exit point on the peripheral surface of said rotary head cylinder as said first guide roller moves from the first position to the second position thereof; said first guide roller when located in said second position being positioned substantially less than 28 mm upstream of said rotary head cylinder along a tape travel direction for guiding the magnetic recording tape onto the peripheral surface of said rotary head cylinder; a second guide roller being movable between a first position wherein said second guide roller is located in said opening of said cassette and a second position wherein said second guide roller is located outside said opening of said cassette, its movement from the first position to the second position thereof corresponding to movement of said first guide roller from the first position to the second position thereof upon rotation of said loading ring, said second guide roller when in its second position engaging magnetic recording tape pulled out from said cassette and being positioned upstream of said first guide roller along a tape travel direction to retain said magnetic recording tape traveling from upstream of said second guide roller to said first guide roller from being brought into contact with said peripheral surface of said rotary head cylinder; a tilt post being movable between a first position wherein said tilt post is located in said opening of said cassette and a second position wherein said tilt post is located outside said opening, its movement from the first position to the second position thereof corresponding to movement of said first guide roller from the first position to the second position thereof upon rotation of said loading ring, said tilt post in its second position engaging magnetic recording tape pulled out from said cassette and being positioned upstream of said second guide roller along the tape travel direction to prevent said magnetic recording tape traveling from said cassette to said second guide roller from being brought into contact with said peripheral surface of said rotary head cylinder and guiding the magnetic recording tape from said cassette to said first guide roller through said second guide roller; a tilt subpost; and means to dispose said tilt subpost in the immediately adjacent vicinity of the tape exit point on the outer surface of said rotary cylinder to bring the tilt subpost into contact with the magnetic recording tape fed from said rotary head cylinder to align a longitudinal edge of said magnetic recording tape between the tape exit point and a capstan to be substantially parallel with said chassis, said rotary head cylinder being inclined toward a point located on the peripheral surface of said rotary head cylinder through an angular distance of 139° to 229° in a direction of the running of said magnetic recording tape on the peripheral surface of said rotary head cylinder from a point where the magnetic recording tape is separated from said rotary head cylinder, whereby a size reduction of a μ-type magnetic recording/reproducing apparatus is achieved.

2. An apparatus according to claim 4, wherein said tilt subpost is movable between a first position wherein said tilt subpost is spaced apart from said magnetic recording tape and a second position wherein said tilt subpost is brought into contact with said magnetic recording tape at a position downstream of said rotary head cylinder along the tape travel direction so as to guide said magnetic recording tape, the first position of said tilt subpost being located in the opening.

3. An apparatus according to claim 1, wherein said first guide roller when located in said second position is spaced from said tape entrance point by a distance of 20 mm.

4. The apparatus according to claim 3, wherein the height of said first guide roller above the chassis is h and the height of the upper edge of the magnetic recording tape is H, with h-H being 6.5 mm.

5. Apparatus according to claim 4, wherein the diameter of said loading ring is 70 mm.

6. The apparatus according to claim 5, wherein the distance between the first guide roller in its second position and the tilt post in its second position is 37 mm taken in a direction parallel to a tangent at said tape entrance point.

7. The apparatus according to claim 1, wherein the height of said first guide roller above the chassis is h and the height of the upper edge of the magnetic recording tape is H, with h-H being 6.5 mm.

8. Apparatus according to claim 1, wherein the diameter of said loading ring is 70 mm.

9. The apparatus according to claim 1, wherein the distance between the first guide roller in its second position and the tilt post in its second position is 37 mm taken in a direction parallel to a tangent at said tape entrance point.

* * * * *